(12) United States Patent
Van Der Upwich

(10) Patent No.: US 11,592,847 B2
(45) Date of Patent: Feb. 28, 2023

(54) DEVICE AND METHOD FOR LIMITING OR KEEPING CONSTANT A FLOWING QUANTITY OF LIQUID

(71) Applicant: Cenergist Spain SL, Madrid (ES)

(72) Inventor: Stijn Van Der Upwich, Huizen (NL)

(73) Assignee: CENERGIST SPAIN SL, Madrid (ES)

( * ) Notice: Subject to any disclaimer, the term of this patent is extended or adjusted under 35 U.S.C. 154(b) by 578 days.

(21) Appl. No.: 16/660,235

(22) Filed: Oct. 22, 2019

(65) Prior Publication Data

US 2020/0050220 A1 Feb. 13, 2020

Related U.S. Application Data

(62) Division of application No. 15/035,367, filed as application No. PCT/NL2014/050776 on Nov. 10, 2014, now Pat. No. 10,459,457.

(30) Foreign Application Priority Data

Nov. 8, 2013 (NL) ..................................... 2011765

(51) Int. Cl.
*F16K 15/14* (2006.01)
*G05D 7/01* (2006.01)
(Continued)

(52) U.S. Cl.
CPC ........... *G05D 7/012* (2013.01); *B29C 45/376* (2013.01); *E03C 1/02* (2013.01); *F16K 7/17* (2013.01);
(Continued)

(58) Field of Classification Search
CPC ......... Y10T 137/7848; Y10T 137/7874; Y10T 137/7875; Y10T 137/7891; G05D 7/0173
(Continued)

(56) References Cited

U.S. PATENT DOCUMENTS

| 2,516,373 A | 7/1950 | Ehlert et al. |
| 2,899,981 A * | 8/1959 | Binks ...................... F16L 55/04 138/46 |

(Continued)

FOREIGN PATENT DOCUMENTS

| DE | 1081656 B | 5/1960 |
| DE | 2403084 A1 | 7/1975 |

(Continued)

OTHER PUBLICATIONS

Office Action for U.S. Appl. No. 17/354,033 dated May 25, 2022.

*Primary Examiner* — Robert K Arundale
(74) *Attorney, Agent, or Firm* — Harness, Dickey & Pierce, P.L.C.

(57) ABSTRACT

A device for limiting or keeping constant a quantity of fluid flowing therethrough, includes: a housing with a front chamber and a rear chamber; a partition arranged in the housing with two or more openings; and a flow limiting element arranged in one or both openings. The flow limiting element includes a housing provided with an inlet, an outlet and a throughflow opening; and a resilient plate-like valve element mounted in the housing, substantially able to close the throughflow opening by resilient movement in the direction of a valve seat arranged in the housing adjacently of the throughflow opening. The valve element is fixed on one side and can move resiliently on the opposite side in the direction of the valve seat. A mould produces one or more injection-moulded products. The injection-moulded product is a flow limiter for limiting the force of the flow of a fluid flowing therethrough.

22 Claims, 16 Drawing Sheets

(51) Int. Cl.
*B29C 45/37* (2006.01)
*E03C 1/02* (2006.01)
*F16K 7/17* (2006.01)
*F16K 27/00* (2006.01)
*B29L 31/00* (2006.01)

(52) U.S. Cl.
CPC .......... *F16K 15/144* (2013.01); *F16K 27/003* (2013.01); *B29L 2031/7506* (2013.01); *E03C 2001/026* (2013.01); *Y10T 137/7891* (2015.04)

(58) Field of Classification Search
USPC .......................................................... 138/46
See application file for complete search history.

(56) References Cited

U.S. PATENT DOCUMENTS

| | | | |
|---|---|---|---|
| 3,347,264 A | 10/1967 | Bunn | |
| 3,551,948 A | 1/1971 | Eggert | |
| 4,008,031 A | 2/1977 | Weber | |
| 4,184,835 A | 1/1980 | Talbot | |
| 4,230,149 A * | 10/1980 | Worthen | A01G 25/16 137/504 |
| 4,778,632 A | 10/1988 | Bakalar | |
| 4,828,769 A | 5/1989 | Maus et al. | |
| 5,295,478 A * | 3/1994 | Baldwin | A61M 16/208 128/202.28 |
| 5,512,221 A | 4/1996 | Maus et al. | |
| 5,586,874 A * | 12/1996 | Hashimoto | F16F 9/3485 137/856 |
| 5,595,214 A * | 1/1997 | Shaffer | F16D 43/284 137/513.5 |
| 5,792,392 A | 8/1998 | Maus et al. | |
| 6,499,986 B1 | 12/2002 | Saito | |
| 6,523,571 B1 * | 2/2003 | Kim | F04B 39/1073 137/856 |
| 6,631,737 B1 * | 10/2003 | Kipping | E03C 1/084 239/572 |
| 7,462,027 B2 | 12/2008 | Chien | |
| 7,494,334 B2 | 2/2009 | Tsai | |
| 7,563,088 B2 | 7/2009 | Tsai | |
| 7,891,970 B2 | 2/2011 | Hoogland | |
| 8,167,002 B2 * | 5/2012 | Kuhne | G05D 7/0113 137/504 |
| 10,619,749 B2 * | 4/2020 | Lee | E03C 1/025 |
| 2005/0046075 A1 | 3/2005 | Youngs et al. | |
| 2005/0079081 A1 * | 4/2005 | Nieter | F04B 39/1073 417/567 |
| 2010/0319784 A1 | 12/2010 | Kuhne et al. | |
| 2015/0030484 A1 * | 1/2015 | Rosa | F16K 15/16 417/559 |

FOREIGN PATENT DOCUMENTS

| | | |
|---|---|---|
| DE | 19821648 A1 | 11/1999 |
| DE | 202011108603 U1 | 6/2012 |
| EP | 1131687 A1 | 9/2001 |
| EP | 3066268 A2 | 9/2016 |
| EP | 3066268 B1 | 9/2020 |
| EP | 3744911 A1 | 12/2020 |
| EP | 3812518 A1 | 4/2021 |
| JP | 2003127181 A | 5/2003 |
| NL | 1010592 A1 | 8/1999 |
| NL | 2011765 C2 | 5/2015 |
| WO | WO-2012059817 A2 | 5/2012 |
| WO | WO-2015/069114 A2 | 5/2015 |

* cited by examiner

DEVICE AND METHOD FOR LIMITING OR KEEPING CONSTANT A FLOWING QUANTITY OF LIQUID

CROSS-REFERENCE TO RELATED APPLICATIONS

This is a divisional of and claims priority under 35 U.S.C. § 120 to U.S. application Ser. No. 15/035,367, filed May 9, 2016, which is a U.S. National Phase application of PCT Application No. PCT/NL2014/050776, filed Nov. 10, 2014, which claims priority to Dutch Patent Application No. 2011765, filed Nov. 8, 2013, the contents of each of which are incorporated herein by reference.

The present invention relates to a device for limiting and/or keeping constant a quantity of liquid flowing therethrough.

The invention also relates to a method for producing one or more injection-moulded products, and a mould.

Clean drinking water is a scarce resource in many regions of the world. In the Western world a great deal of water is wasted by individuals in taking a bath or shower. Despite the fact that many measures have been taken in Western countries, the amount of energy involved in a shower or bath has continued to increase relatively.

Pressure-independent flow limiters are marketed very successfully by applicant, particularly in the United Kingdom and other countries. Such flow limiters are described in EP 1.131.687 A and the Netherlands patent application no. 1010592.

Compared to flow limiters of other manufacturers, which usually make use of rubber brings and the like, a considerable improvement is obtained with these known flow limiters, this being due to the ability of these known flow limiters of applicant to provide over a period of years an accurate flow rate of for instance 7.8 (+/−0.1) litres per minute within a (dynamic) pressure interval of 2.5-10 bar. Existing flow limiters of other manufacturers appear in practice to generate a much less constant and accurate flow rate, particularly in the case of pressure loss (pressure drop), this being particularly undesirable in the case of showers and the like and with the aim of comfortable use of water.

There is also a need in hotels, cruise ships and in (the petrochemical) industry for flow limiters in order to limit and/or keep constant the force of a flow of liquid. Owing to the flow limiters of applicant water utility companies can determine more precisely the capacity of the required installations when such flow limiters are arranged in hotels, office buildings, private residences and the like at many locations in the area which they supply. Savings in the costs of installations are hereby considerable.

An essential element of the flow limiter of applicant is manufactured by means of injection moulding. It is important for the operation of many injection-moulded products that the dimensioning of these manufactured products corresponds to the required specifications. Particularly in the case of flow limiters which aim to be pressure-independent, the dimensioning of different components is found to be critical in obtaining effective operation.

A first object of the present invention is to further improve and make known flow limiters available over a wide range of flow rates.

A second object of the present invention is to manufacture injection-moulded products in large numbers with a very high precision, in particular flow limiters with an accurate flow rate.

According to a first aspect, the present invention provides for this purpose a device for limiting a quantity of fluid flowing therethrough, comprising a housing which comprises a front chamber and a rear chamber; a partition arranged in the housing and provided with two or more openings; and a flow limiting element arranged in one or both openings.

It becomes possible with this device to determine more precisely the peak load of the water use in for instance a large city or industrial zone, the more so in that the device can be arranged at many locations in a mains system. A very large amount of money can be saved by determining this peak load, as disproportionately high costs are involved in managing and supply of peak requirements.

In further preferred embodiments of the invention the partition is disc-shaped and provided with two, three, four, five and preferably six or seven openings. Many more openings can also be envisaged in other applications, for instance 10-20, 20-30, 30-40, 40-50 and so on. Arranged in a least one of these openings is a flow limiting element which preferably comprises a resilient part for the purpose of limiting the flow rate when pressure increases, wherein the resilient part is preferably embodied in plastic or metal.

The housing is preferably constructed from four parts with sealing rings therebetween so that it is easy to disassemble using screw bolts and one or more openings for a flow limiter can be sealed with a (releasable) plug or blind plate and subsequently reassembled. The flow rate can be adapted as desired by providing or sealing one or more openings of a flow limiting element. It is thus possible to utilize the device in many fields of application.

In a further preferred embodiment the flow limiting element comprises a housing provided with an inlet, an outlet and a throughflow opening; and a resilient plate-like valve element which is mounted in the housing and which can substantially close the throughflow opening by resilient movement in the direction of a valve seat arranged in the housing adjacently of the throughflow opening, wherein the valve element is fixed on one side (by the liquid flow) and the valve element (resilient element) can move resiliently on the opposite side in the direction of the valve seat, wherein at least a part of the surface of the valve seat extends on the side remote from the fixed side of the valve element such that the distance between the valve seat and the valve element is greater at the position of the outer peripheral edge of the valve seat than at the position of the inner peripheral edge of the valve seat.

Said part of the surface of the valve seat preferably extends obliquely.

Because said part of the surface of the valve seat extends in this way, a pressure with an upstream component is realized on the downstream side of the valve element so that the valve element does not close the throughflow opening even at very high pressure and, in the case of a sudden pressure decrease at the inlet of the housing, instantaneously enlarges the throughflow opening in order to maintain the most constant possible flow rate at the outlet.

According to a further preferred embodiment, the distance between the outer and inner diameter of said part of the valve seat amounts to 5% to 40%, preferably 10% to 20% of the distance between the fixed side of the resilient part of the valve element and the resiliently movable outer end of the valve element.

This ratio determines the above stated upstream counterpressure on the downstream side of the valve element and is therefore crucial to a correct operation of the flow limiting element.

In a further preferred embodiment the surface of the valve seat is curved such that the distance between the valve seat and the freely moving part of the valve element is greater at the end of the resiliently movable part of the valve element than at the fixation point.

In a further preferred embodiment the valve seat comprises cam parts for limiting the stroke of at least a part of the freely moving part of the valve element.

These cam parts ensure that the valve element sags progressively relative to the longitudinal axis of the resilient part of the valve element, whereby the flow rate at the outlet of the housing is kept constant in even more accurate manner. It is thus possible for the valve element to operate optimally at both low and high pressures.

In a further preferred embodiment the valve seat has between said part of the valve seat and the fixation point of the valve element at least one recess which locally increases the distance between the valve element and the valve seat.

This recess provides for a swirling flow on the downstream side of the valve element and has the advantage that the direction of the liquid flow at the outlet is substantially the same as the direction of the liquid flow at the inlet, wherein a good throughflow is moreover provided.

In further preferred embodiments the valve element is of sheet steel and/or mounted releasably in the housing and/or supported on a support point in the housing by means of an eccentric hole in the valve element.

More preferably applied is spring steel, i.e. hardened sheet steel.

According to a further preferred embodiment, the housing comprises a cushion part which, together with the support point, determines the degree of clamping of the valve element at the end of the fixed part of the valve element. The degree to which the valve element opens can hereby be determined.

The invention also relates to a flow limiting element for limiting the force of the flow of a fluid flowing therethrough, comprising: a housing provided with an inlet, an outlet and a throughflow opening; and a resilient plate-like valve element which is arranged in the housing and which can substantially close the throughflow opening by resilient movement in the direction of a valve seat arranged adjacency of the throughflow opening in the housing, wherein the valve element is fixed on one side and the valve element can move resiliently on the opposite side in the direction of the valve seat, wherein at least a part of the surface of the valve seat extends on the side remote from the fixed side of the valve element such that the distance between the valve seat and the valve element is greater at the position of the outer peripheral edge of the valve seat than at the position of the inner peripheral edge of the valve seat.

Because said part of the surface of the valve seat extends in this way, the valve element does not close the throughflow opening even at very high pressure and, in the case of a sudden pressure decrease at the inlet of the housing, instantaneously enlarges the throughflow opening in order to maintain the most constant possible flow rate at the outlet.

The invention also relates to a method for limiting or keeping constant a quantity of flowing fluid, wherein the fluid is mixed in a front chamber in a housing, flows through openings in a partition arranged in the housing and provided with flow limiters and/or plugs and comes together again in a rear chamber arranged behind the partition in the housing, wherein the flow rate of the fluid is limited in at least one opening.

According to a preferred embodiment of the method, the flow rate is dependent on one or more openings with flow limiting elements and one or more openings which are covered.

The flow rate can be adapted as desired by providing one or more openings with a flow limiting element or by covering one or more openings. It is thus possible to utilize the device in many fields of application.

The invention also relates to a method for spraying clean facades, walls, ships, aircraft, cars, trucks and the like wherein the flow rate is determined by the flow rate of one flow limiting element multiplied by the number of openings in which the flow limiting elements are arranged.

According to a second aspect, the invention provides a mould for producing one or more injection-moulded products, wherein at least a part of the mould is movable and adjustable such that the size and/or the shape of the mould cavity is adjustable.

According to a preferred embodiment, the one or more movable parts of the mould are adjustable from the outer side of the mould.

The mould need hereby neither cool nor be opened in order to change the shape of the mould cavity. Because the mould cavity can be changed during the injection moulding process, the dimensioning or design of the product can be efficiently modified as desired without appreciable interruptions in the injection moulding process.

An injection moulding process must in this context preferably be understood to mean the manufacture of a series of products by injection moulding. The modification or changing of the mould for the purpose of modifying the product to be manufactured then preferably takes place between two successive production cycles, wherein a cycle can be understood to mean either the manufacture of one product or a plurality of products simultaneously. It is then particularly advantageous that the mould can be changed without the mould having to cool and/or be disassembled.

According to a further preferred embodiment, the injection-moulded product is a flow limiting element for limiting the force of the flow of a fluid flowing therethrough, comprising: a housing provided with an inlet, an outlet and a throughflow opening; and a resilient plate-like valve element which is mounted in the housing and which can substantially close the throughflow opening by resilient movement in the direction of a valve seat arranged adjacency of the throughflow opening in the housing, wherein the valve element is fixed on one side and the valve element can move resiliently on the opposite side in the direction of the valve seat.

The dimensioning of the different components is particularly important in the case of flow limiting elements which aim to be pressure-independent. The precision of the dimensioning of these components determines the accuracy with which a constant flow rate can be maintained at the outlet.

According to further preferred embodiments, the movable part is adjustable for the purpose of adapting the dimensions, the shape and/or the location of the valve seat which determines the width and length of a gap between the valve element and the valve seat; protruding cam elements on the valve seat which limit the stroke of at least a part of the freely moving part of the valve element; the location of the cam parts relative to the valve seat; and the mounting means for the valve element (or resilient element).

Because the dimensions, the shape and/or the location of the valve seat, the cam parts and the mounting means can be adapted, optionally relative to each other, the stroke, the degree of clamping and the supporting of the valve element and the gap dimensions can be influenced, and an accurate constant flow rate can be realized at the outlet of the flow limiting element at both relatively high and relatively low pressure. It is particularly advantageous for the cam parts to be situated on the valve seat and for the height of the cam parts to be adjustable relative to the valve seat. This ensures that the gap dimensions, determined by the stroke of the valve element on the one hand and the height and/or width of the valve seat on the other, can be optimized.

According to a preferred embodiment, the movable part is adjustable by means of adjusting screws and/or adjusting means which taper and push against the movable part such as to provide for a continuously variable adjustment of the movable part.

The movable part can hereby be adjusted with great precision in order to obtain an extremely precise dimensioning of the injection-moulded product.

In a further preferred embodiment a resilient element is provided for the purpose of pushing the movable part outward relative to the mould cavity during the movement of the adjusting screw and/or the adjusting means to the outer side of the adjustable mould.

This resilient element also contributes in particular toward a precise adjustment in a controlled manner of the movable mould cavity shape-defining part.

The invention further relates to a method for producing one or more injection-moulded products, wherein the injection-moulded product is manufactured in a mould according to any of the claims 1-10, wherein between the manufacture of two injection-moulded products at least a part of the mould is moved such that the size and/or shape of the mould is adjusted.

According to a preferred embodiment, the movable part of the mould is adjusted from the outer side of the mould.

According to a further preferred embodiment, at least a part of the mould is moved such that the size and/or the shape of the mould is adjusted without disassembling the mould.

The mould need hereby neither cool nor be disassembled in order to change the shape of the mould cavity. Because the mould cavity can be changed during the injection moulding process, the dimensioning or design of the product can be modified efficiently as desired without appreciable interruptions in the injection moulding process.

According to yet another preferred embodiment, the movable part is adjusted subject to a variation in thickness and/or composition of the valve element.

This is particularly advantageous so as to be able to correct for a variation in thickness and/or precise composition of the material of the resilient valve element between manufacture of different series of valve elements. Even within one roll of spring steel the properties of the sheet steel can already vary such that adjustment of the mould is desirable, e.g. after a considerable part of the roll has been unrolled. The dimensioning of the different components of the injection-moulded product can be modified subject to for instance tests between production cycles.

Further advantages, features and details of a first and second aspect of the present invention are elucidated on the basis of the following description of preferred embodiments thereof with reference to the accompanying drawings, in which.

Figure 1:
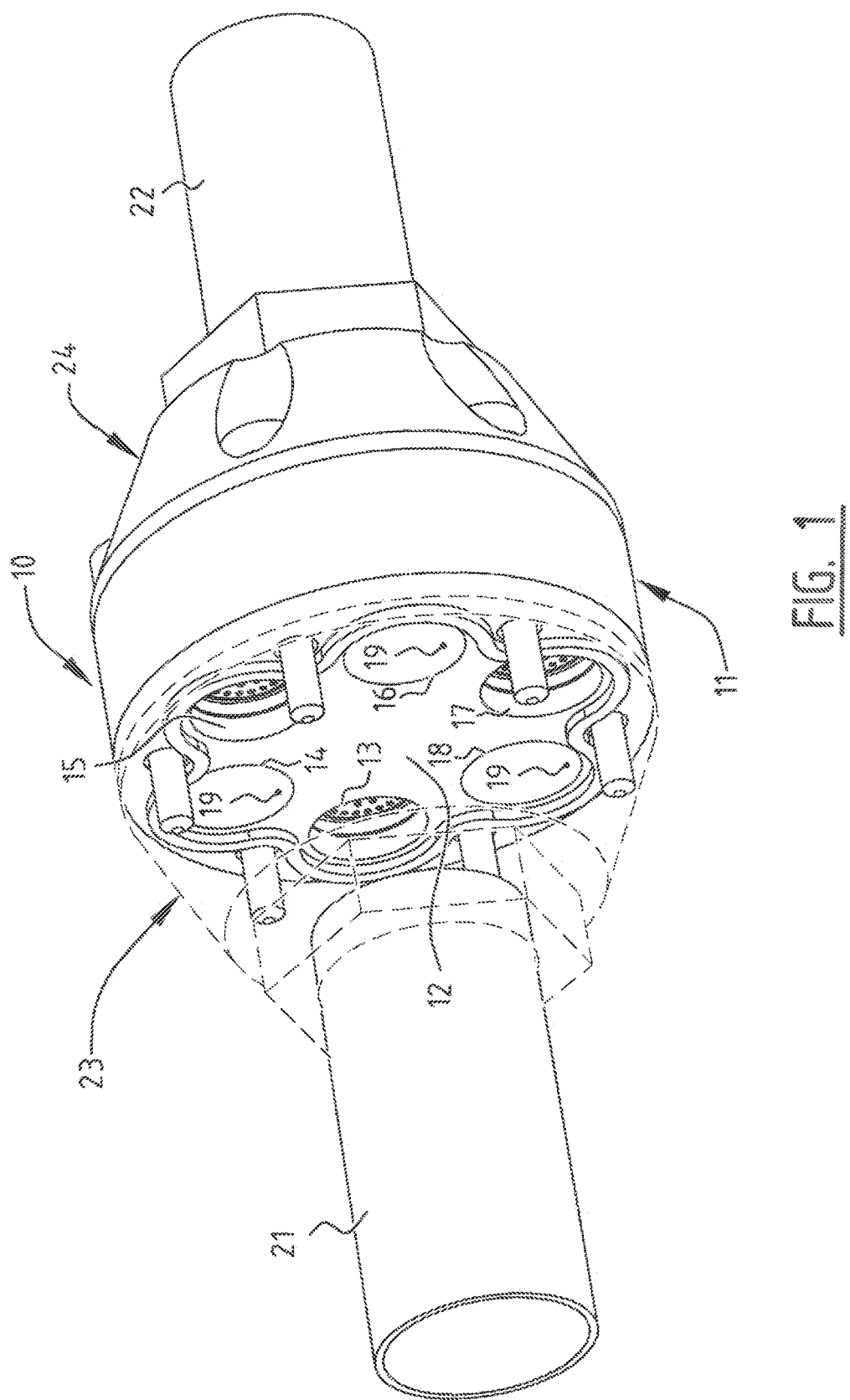
FIG. 1 is a partially cut-away perspective view of a preferred embodiment of a device according to the present invention.
Figure 2:
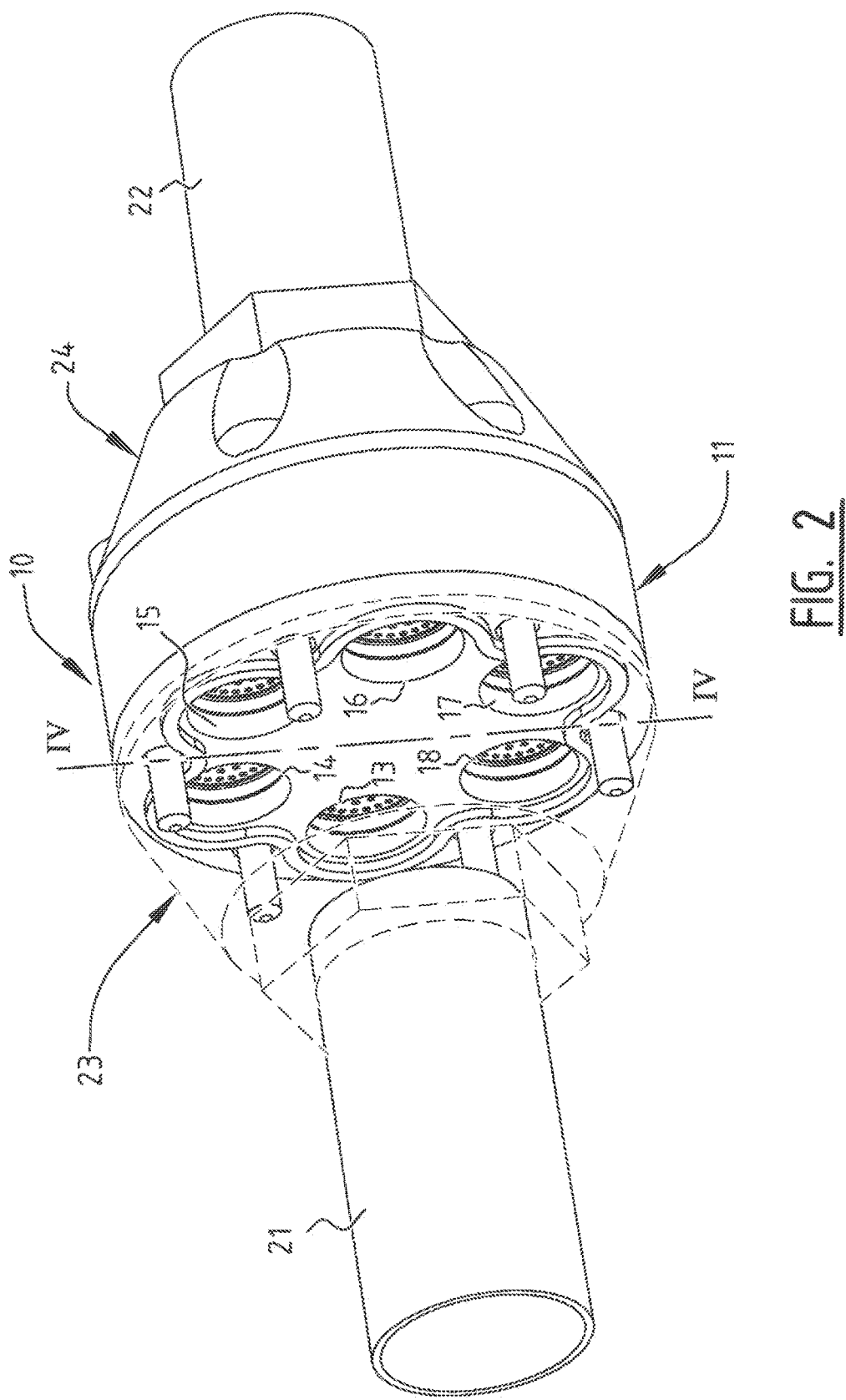
FIG. 2 shows the perspective view of the device of FIG. 1 with a greater flow rate.

A preferred embodiment of a device 10 (FIG. 1) according to the present invention comprises a housing 11 in which is received a central partition 12 with six openings 13, 14, 15, 16, 17 and 18, of which three, 14, 16 and 18, are covered with cover plates 19. An inlet tube 21 and an outlet tube 22 are connected to the housing. Inlet tube 21 debouches in a front chamber 23 which is shown in broken lines and is situated opposite outlet tube 22 in rear chamber 24. In FIG. 2 the cover plates 19 are removed so that device 10 according to FIG. 2 allows six times the quantity of liquid to pass through within a determined pressure range of for instance 6×5.0 litres per minute or 6×7.8 litres per minute, this is in contrast to the embodiment shown in FIG. 1 where only three times this flow rate can flow through.

It will be apparent that the preferred embodiment according to the present invention has a wide variation in possible flow rates, i.e. from 1×5.0 litres to 6×7.8 litres and all flow rates between, for instance 2×5.0 litres and 3×7.8 litres.

Figure 3:
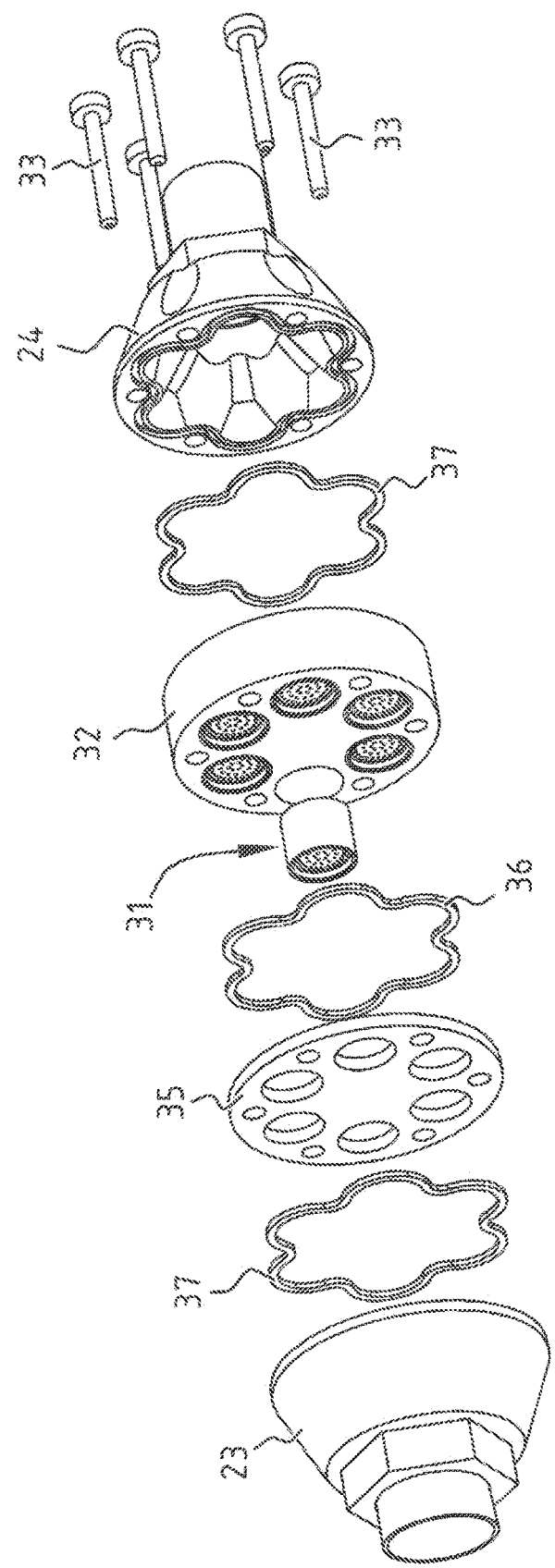
FIG. 3 is an exploded view of the device according to FIGS. 1 and 2.

Flow limiting elements 31 (FIG. 3) are easily exchangeable from a disc-shape central part 32. The foremost part 23 of the housing encloses a gasket 37 which on the one hand is tightened fixedly against and seals on disc 35 using screw bolts 33, while further seals 36 and 37 realize the scaling between respectively disc 35 and central part 32 and rear part 24 and disc 32.

Figure 4:
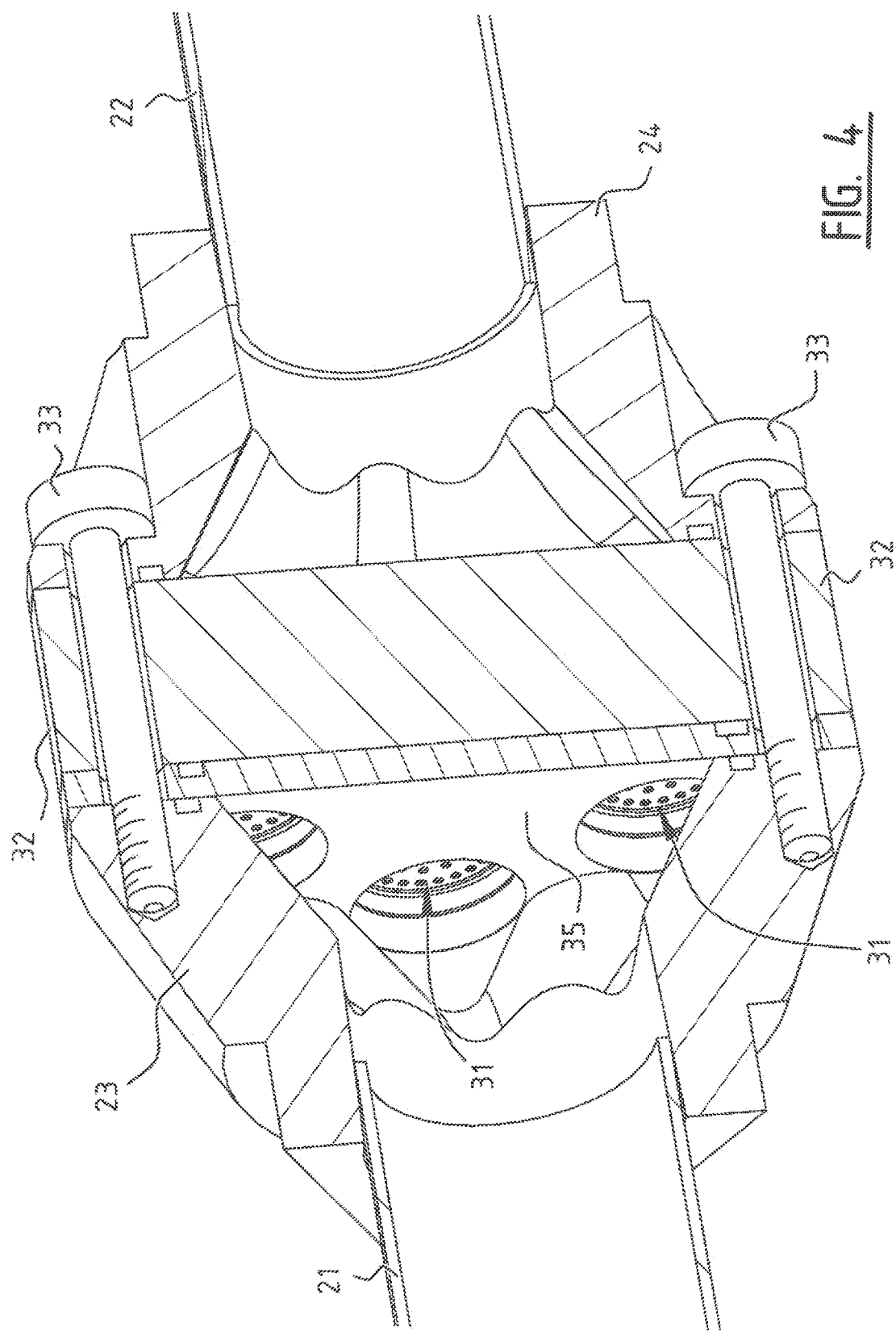
FIG. 4 is a view in partial cross-section along the line IV-IV in FIG. 2.

In FIG. 4 screw bolts 33 protrude from rear housing part 24 through holes in central part 32 and are screwed fixedly into front housing part 23, wherein disc 35 holds throughflow elements 31 in their place.

Figure 5:
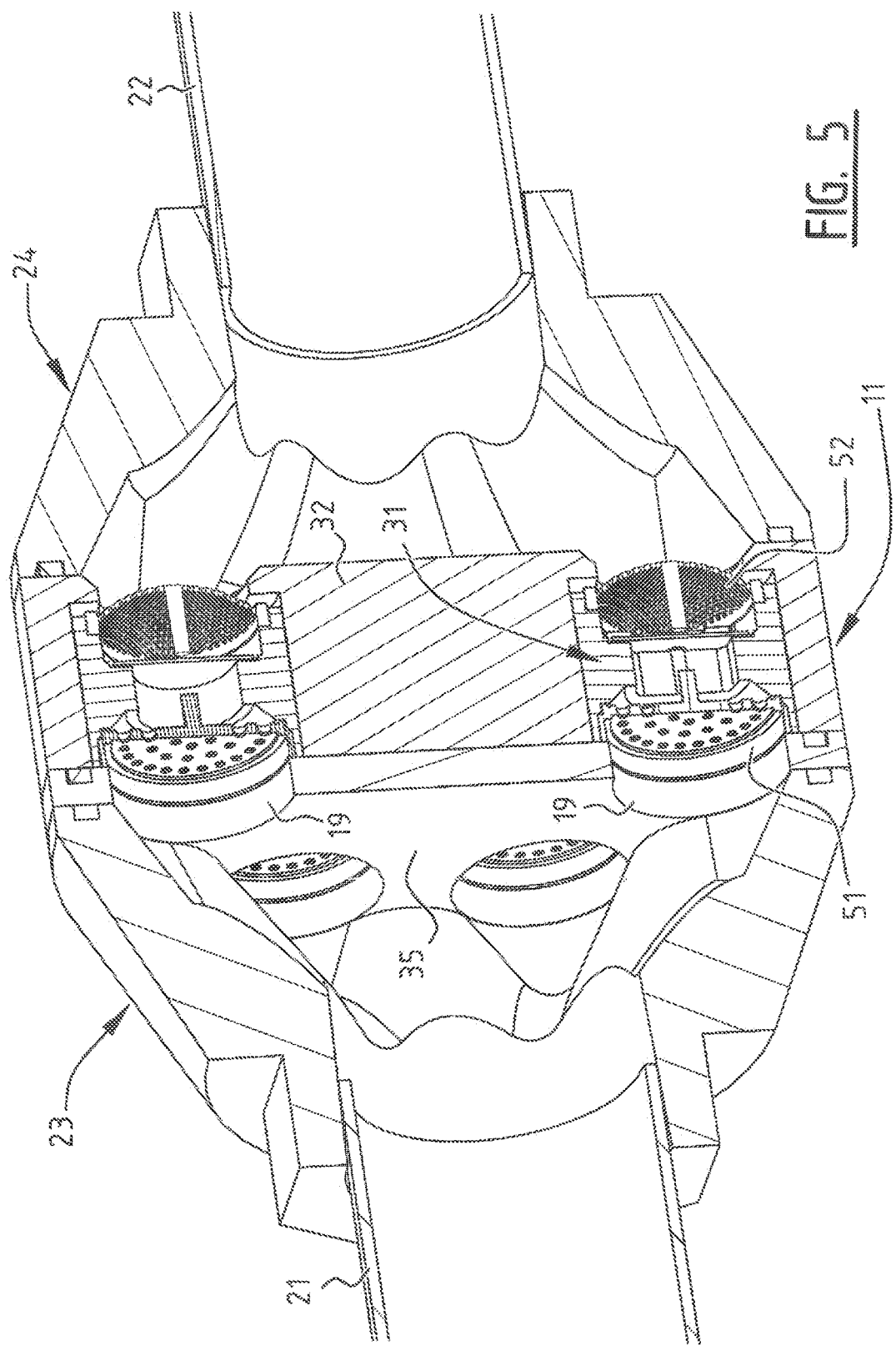
FIG. 5 is a view in partial cross-section along the line V-V in FIG. 1.

Cover plates 19 (FIG. 5) cover the flow limiting elements 31 which comprise a resilient part with limited stroke as well as distributor 51 and an outlet part 52.

A liquid can flow through such an element 31 at an extremely constant flow rate within a dynamic pressure range of 2.5-10 bar.

As will be apparent from the above, a preferred embodiment of the device according to the present invention can be made suitable for many applications, wherein six (or more or fewer) flow limiting elements with differing flow rates, for instance 5 litres per minute or 7.8 litres per minute, can be applied in varied manner. Because of the chambers on the inflow and outflow side the liquid flows are properly mixed while the product is easy to disassemble and can be reassembled for an application wherein a higher or lower flow rate is desired. A user can exchange the different flow limiting elements in simple manner and optionally provide them with a cover plate. A relatively large front chamber offers little resistance, can easily mix hot and cold liquid and causes substantially no unnecessary sound or noise.

The front and rear chambers can be made wholly dome-shaped, which in all likelihood provides an even better operation than the truncated cone shape as shown and described.

Figure 7:
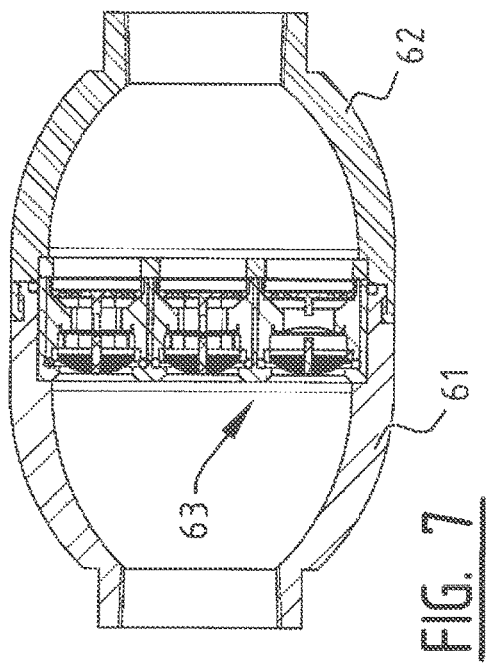
FIG. 7 shows a longitudinal section through the embodiment of FIG. 6.
Figure 8:
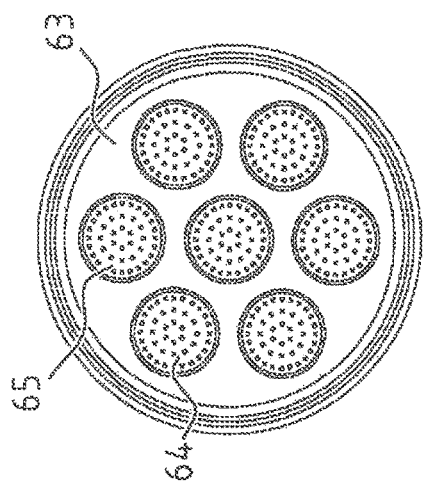
FIG. 8 shows a cross-section through the embodiment of FIG. 6.
Figure 6:
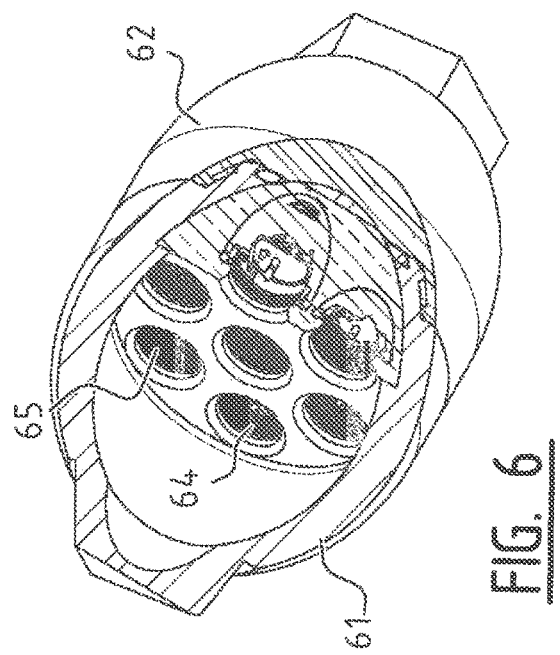
FIG. 6 is a partially cut-away view of another preferred embodiment.

In a further embodiment (FIGS. 6, 7 and 8) two dome-shaped housing parts 61, 62 are screwed fixedly to each other. Following unscrewing a partition-like component is left clear so that one or more of the limiting elements can be exchanged.

Figure 9:
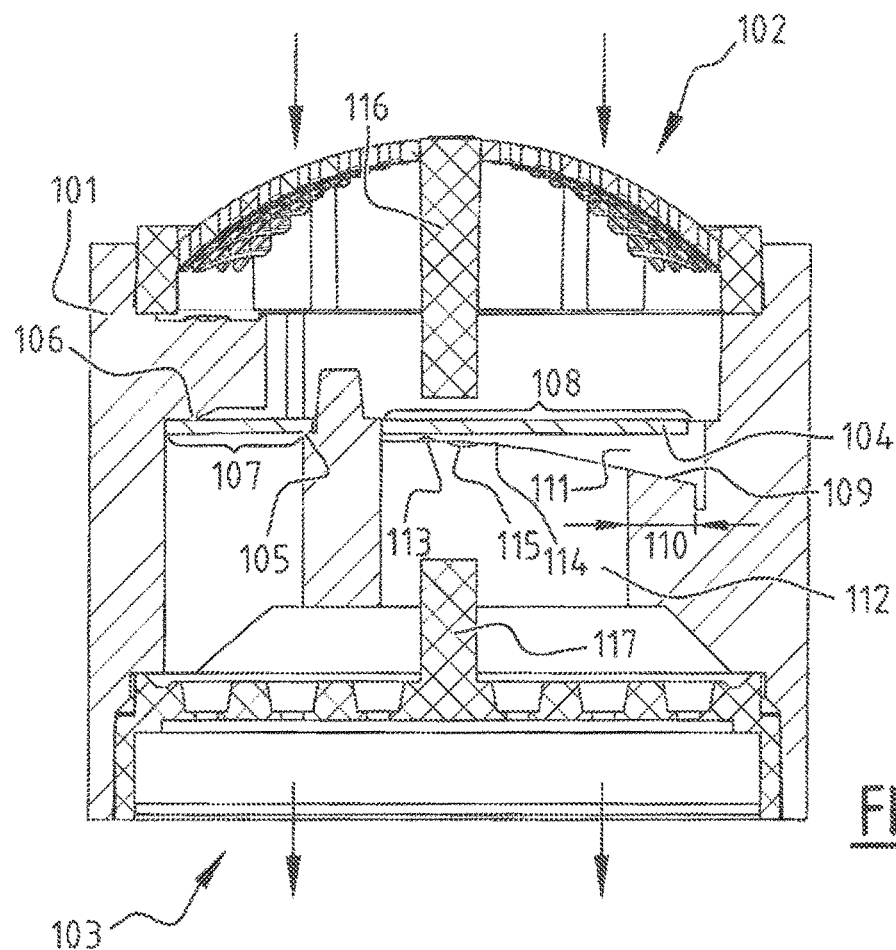
FIG. 9 shows a cross-section through a preferred embodiment of the flow limiting element under an inlet pressure less than or equal to 3 bar.

FIG. 9 shows a cross-section of a preferred embodiment of the flow limiting element consisting of a cylindrical housing 101 provided with an inlet 102 and an outlet 103 for a liquid flow and a plate-like resilient valve element 104 for limiting the liquid flow. The plate-like resilient valve element 104 is supported on a support part 105 in the central downstream part of housing 101, wherein said support part 105 and a cushion part 106 in the peripheral upstream part of housing 101 hold in place a fixed part 107 of valve element 104. This fixation is brought about as follows. The resilient valve element 104 in principle lies unattached in housing 101 and is supported on one side over the whole width by support part 105 and held in place by a pin on support part 105 which fits loosely in a hole arranged in resilient element 104. Both sides, the smaller fixed part 107 and the larger resilient part 108 of the resilient element are exposed to the water pressure and a force is therefore exerted on both sides. The outer end of part 107 on the opposite side of resilient element 104 rests against cushion 106, whereby the valve element is fixed in its position by the flow of the liquid. The size of the throughflow opening can be adjusted in the rest state of valve element 104 by adjusting the thickness of cushion 106. The resilient part 108 of valve element 104 determines, together with a valve seat 109 with thickness 110 inclining downward to the outer end of resilient part 108, the width and length of a narrowing gap 111, wherein said gap 111, together with the space 112 lying on the liquid outlet side of resilient element 104, realizes a pressure drop such that the liquid flow rate at the outlet is constant. In housing 101 protruding parts 113 and 114 are also arranged on valve seat 109 such that under the influence of the inlet pressure they limit the stroke of resilient element 104. Each pair of cams 113, 114 is arranged asymmetrically, i.e. the distance of the two cams 113, 114 from the fixation point differs to some extent. This creates bias in the resilient valve element 104, whereby vibrations of valve element 104 are prevented. Also arranged in valve seat 109 are recesses 115 which influence the liquid flow in the flow limiting element such that the direction of the outgoing liquid flow is substantially the same as the direction of the ingoing liquid flow. A filter 116 is also situated at inlet 102 and a distributor 117 at outlet 103.

Figure 10:
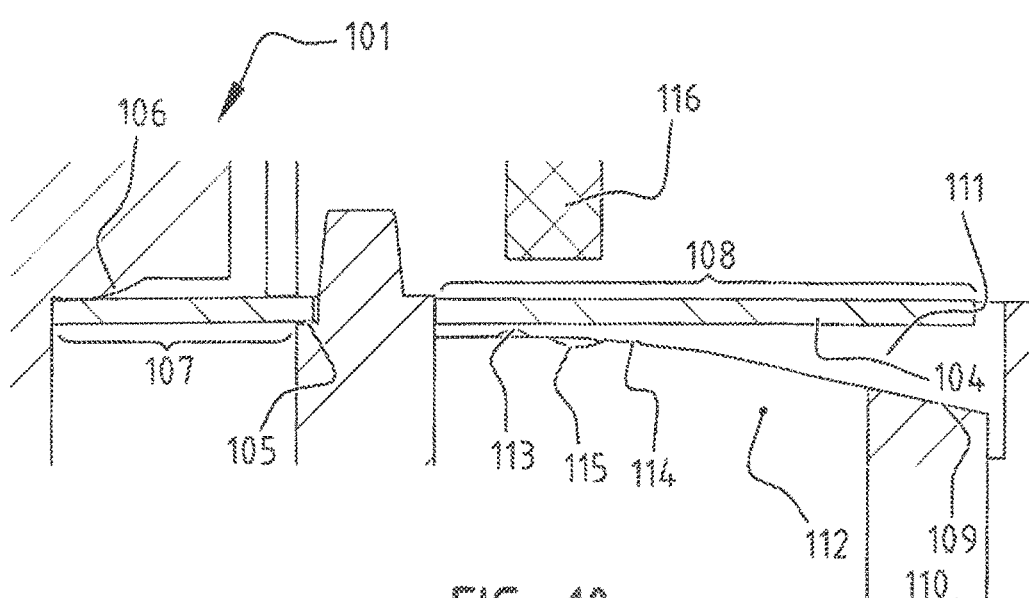
FIG. 10 is an enlarged view of a part of the cross-section of the flow limiting element as shown in FIG. 9.

FIG. 10 shows an enlarged view of a part of FIG. 9, wherein the position of resilient element 104 is shown under an inlet pressure of 3 bar. FIG. 10 also shows an enlarged view of support part 105 and cushion part 106, valve seat 109 with thickness 110, gap 111, cam parts 113 and 114 and recesses 115.

Figure 11:
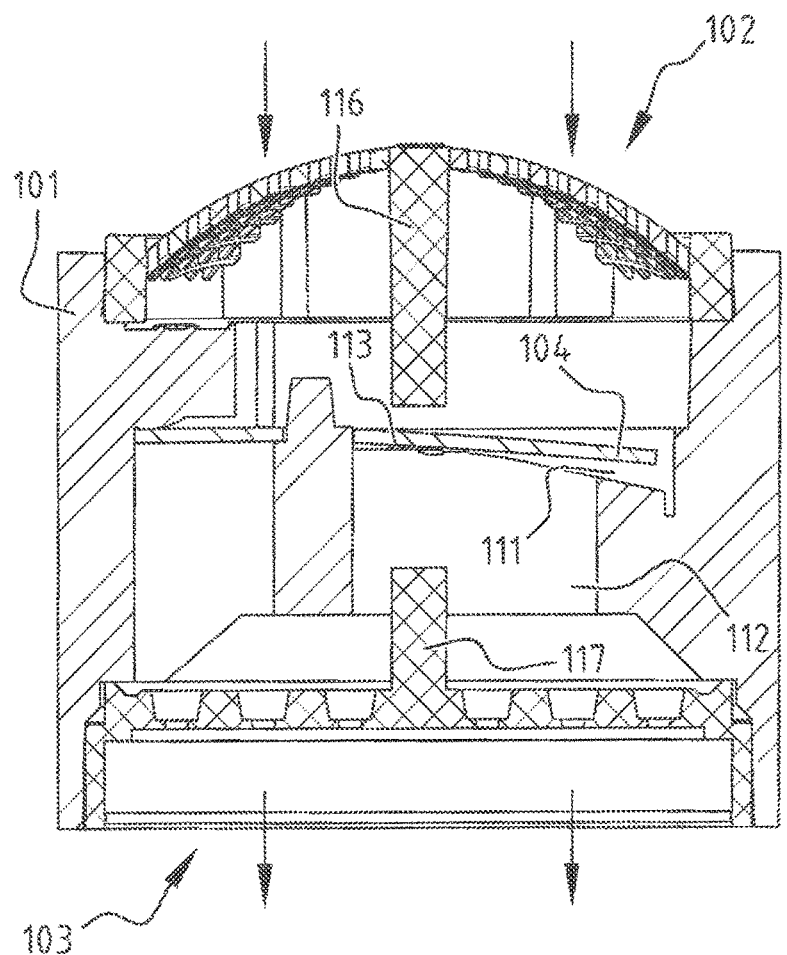
FIG. 11 shows a cross-section of the flow limiting element under an inlet pressure of 4 bar.
Figure 13:
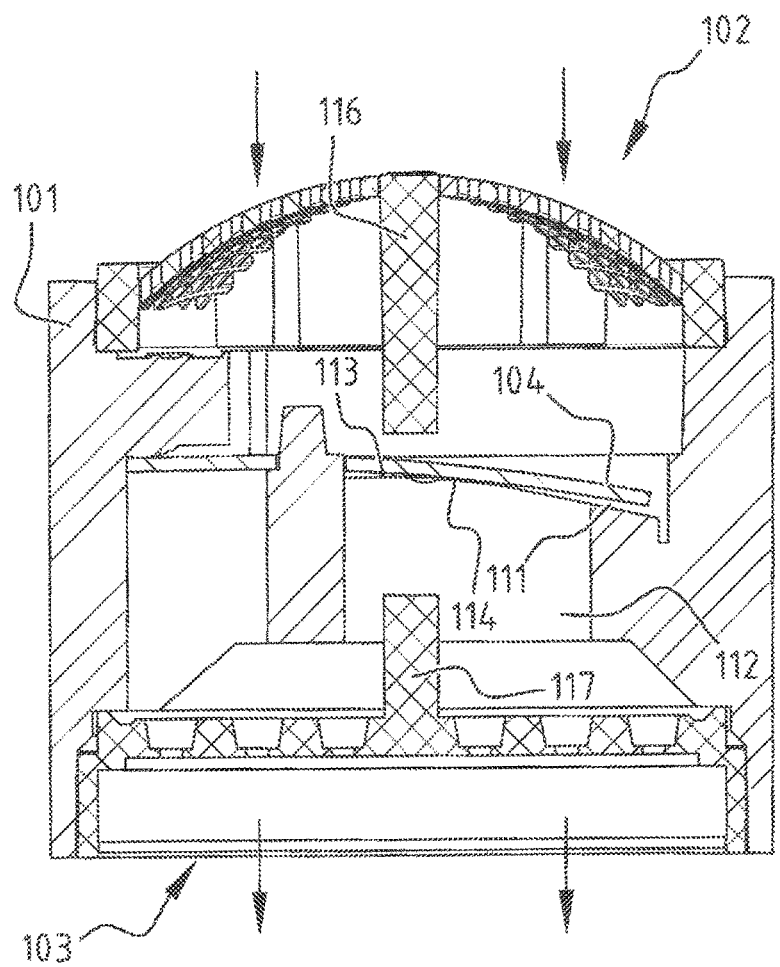
FIG. 13 shows a cross-section of the flow limiting element under an inlet pressure of 5 bar.

FIGS. 11 and 13 show cross-sections of the preferred embodiment of the flow limiting element as described in the description of FIG. 9 under an inlet pressure of respectively 4 and 5 bar.

Figure 12:
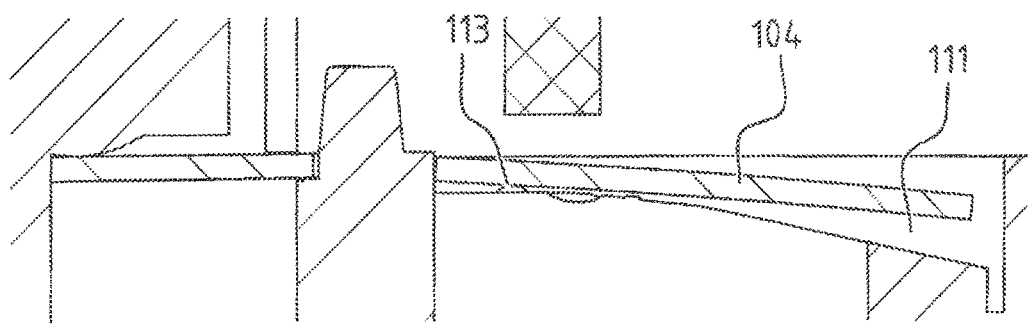
FIG. 12 is an enlarged view of a part of the cross-section of the flow limiting element as shown in FIG. 11.
Figure 14:
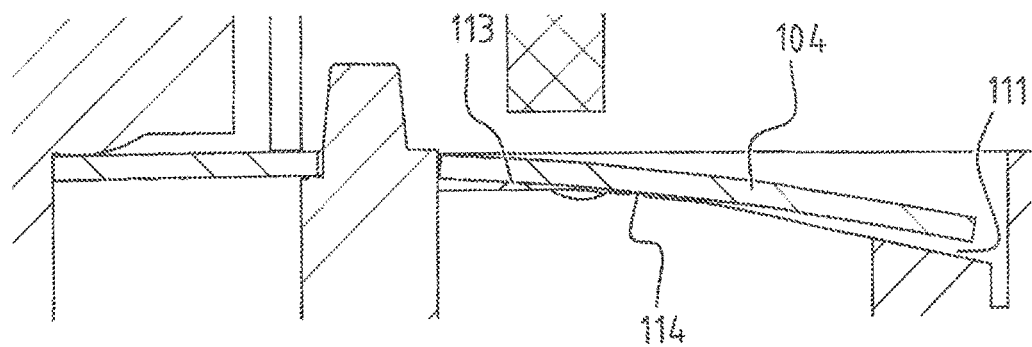
FIG. 14 is an enlarged view of a part of the cross-section of the flow limiting element as shown in FIG. 13.

FIGS. 12 and 14 show enlarged views of respectively FIGS. 11 and 13, wherein the stroke of resilient element 104 limited by cam parts 113 and 114 is shown at an inlet pressure of respectively 4 and 5 bar. Shown is that at an inlet pressure of 4 bar the flexible part 108 of resilient element 104 rests on cam part 113 and that at an inlet pressure of 5 bar the flexible part 108 of resilient element 104 rests on cam parts 113 and 114.

Figure 15:
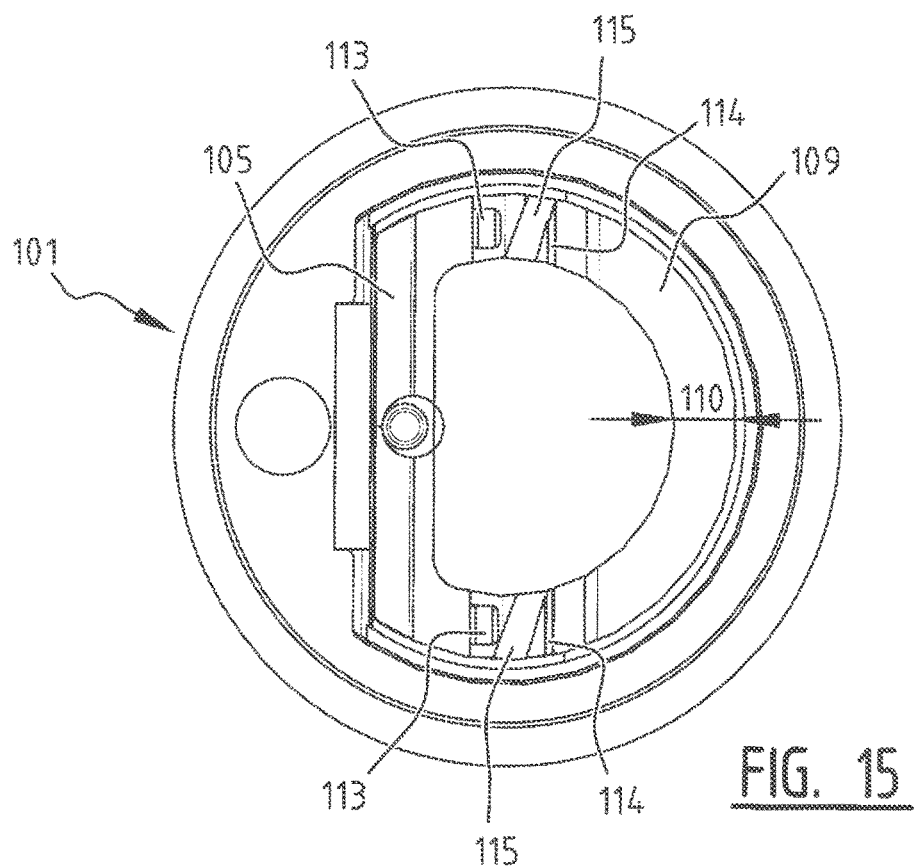
FIG. 15 is a top view of the housing of the flow limiting element.

FIG. 15 is a top view of housing 101 of a preferred embodiment of the flow limiting element which shows support part 105, valve seat 109 with thickness 110, cam parts 113 and 114 arranged on valve seat 109 and recesses 115 arranged in valve seat 109.

Figure 16:
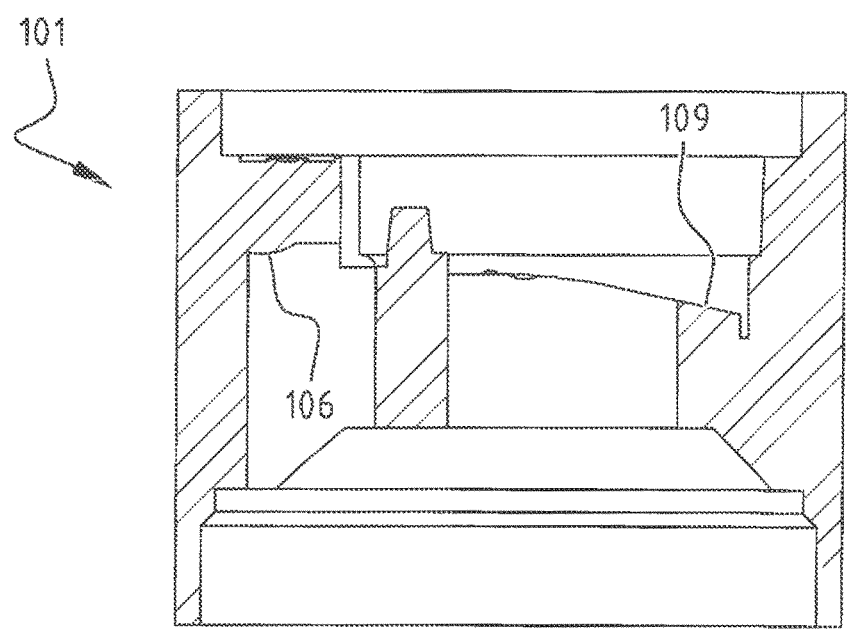
FIG. 16 is a side view of the housing of the flow limiting element.

FIG. 16 is a side view of housing 101 of a preferred embodiment of the flow limiting element which, in addition to the parts stated in FIG. 15, shows cushion part 106 and the inclination of valve seat 109.

Figure 17:
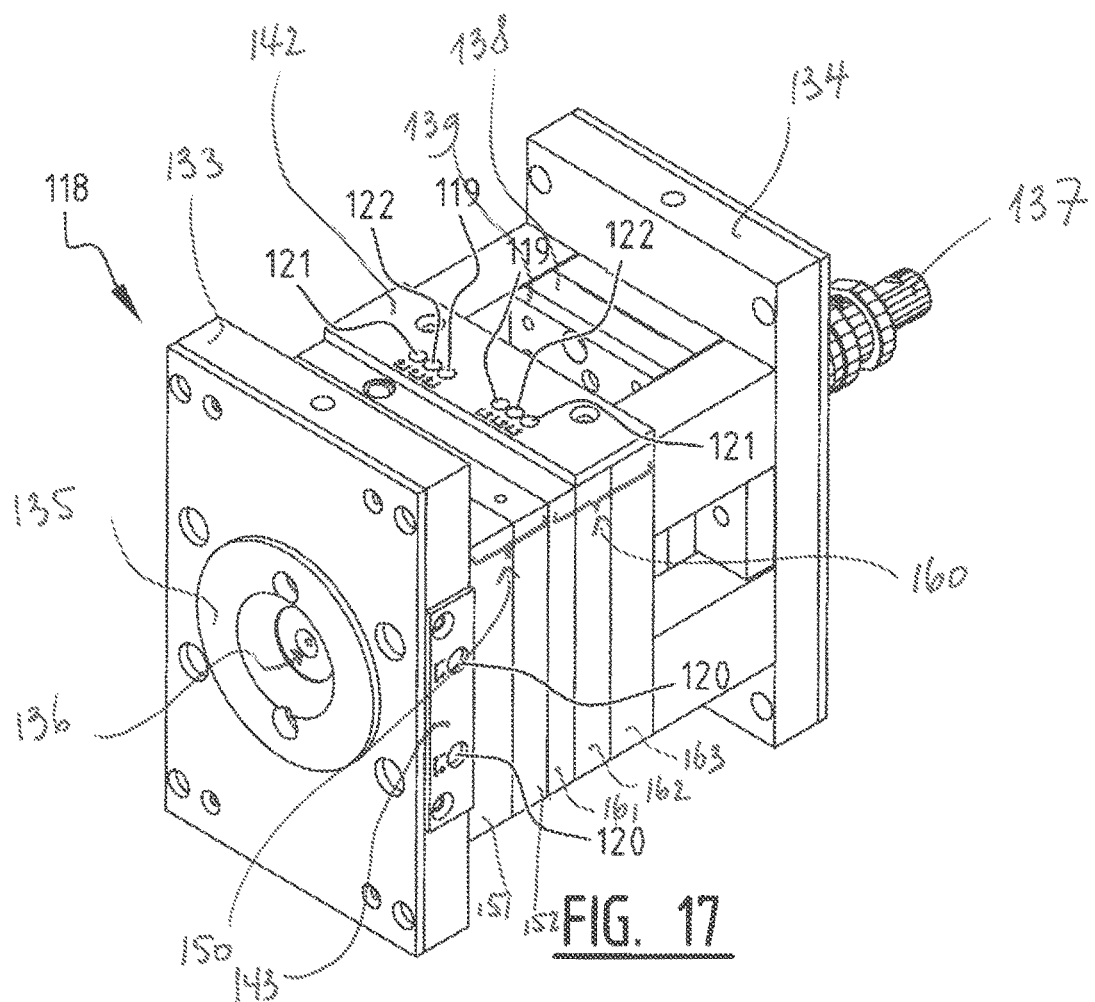
FIG. 17 is a perspective view of a preferred embodiment of the adjustable mould.

FIG. 17 is a perspective view of a preferred embodiment of an adjustable mould 118 according to the present invention, wherein mould 118 is constructed from a plurality of composite and separate (steel) components. The mould can be divided into a front mould 150 and rear mould 160. Mounted on both the front mould 150 and rear mould 160 are tensioning plates, here the shown front plate 133 and rear plate 134 which hold together the (intermediate) components of mould 118. A centering ring 135 and a sprue bush 136 are arranged in front plate 133. Front mould 150 consists of an injection nozzle 151 and a shaping plate 152 which comprises a cavity which defines the dimensions and shape of the injection-moulded product. Rear mould 160 consists of a shaping plate 161, an adjusting plate 162 for adjusting the movable components of the mould, a support plate 163 and an ejector mechanism. The ejector mechanism comprises an ejector 137, an ejection plate 138, an ejection cover plate 139 and ejector pins for releasing the injection-moulded products from mould 118 following cooling of mould 118, which pins must engage on the greatest possible surface area of the product in order to prevent denting in the injection-moulded product. The shape of the mould cavity also determines how smoothly the injection-moulded product can be ejected. Cooling channels for cooling are situated around the cavity. A correct position of these channels is crucial in preventing the occurrence of temperature differences which can result in deformation of the injection-moulded product.

In known moulds so-called inserts, i.e. metal plates of differing form, are necessary to enable shaping of the product, for instance when the product has a specific protrusion. When the two halves of the mould move apart, the inserts can be displaced with different pin constructions so that the shape of the product can be changed. The adjustable mould 118 has the great advantage that these inserts are adjustable from outside when the mould is still warm. As a result the mould does not need to first cool or be disassembled in order to modify the shape and dimensioning of the injection-moulded product between the manufacture of two products. Mould 118 is typically manufactured from steel or aluminium, also because of the heat-exchanging property required for cooling purposes.

Figure 18:
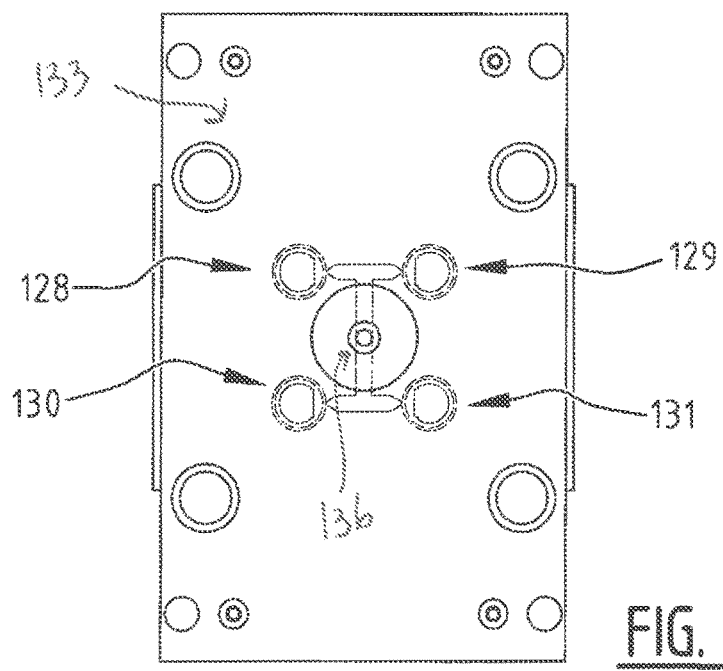
FIG. 18 is a side view of the adjustable mould.

FIG. 17 also shows adjusting screws 119 to 122 which can be turned via openings in cover plates 142 and 143 for adjusting movable parts in mould 118 for the purpose of modifying the dimensions and shape of the injection-moulded product, wherein by means of the front view of the adjustable mould 118 shown in FIG. 18 is shown that mould 118 comprises a so-called multiple mould and is suitable for producing a plurality of injection-moulded products simultaneously—in the shown preferred embodiment four products 128 to 131—wherein the dimensions of injection-moulded products 128 to 131 can be changed independently of each other and during the injection moulding process by means of the adjusting screws 119 to 122.

Figure 19:
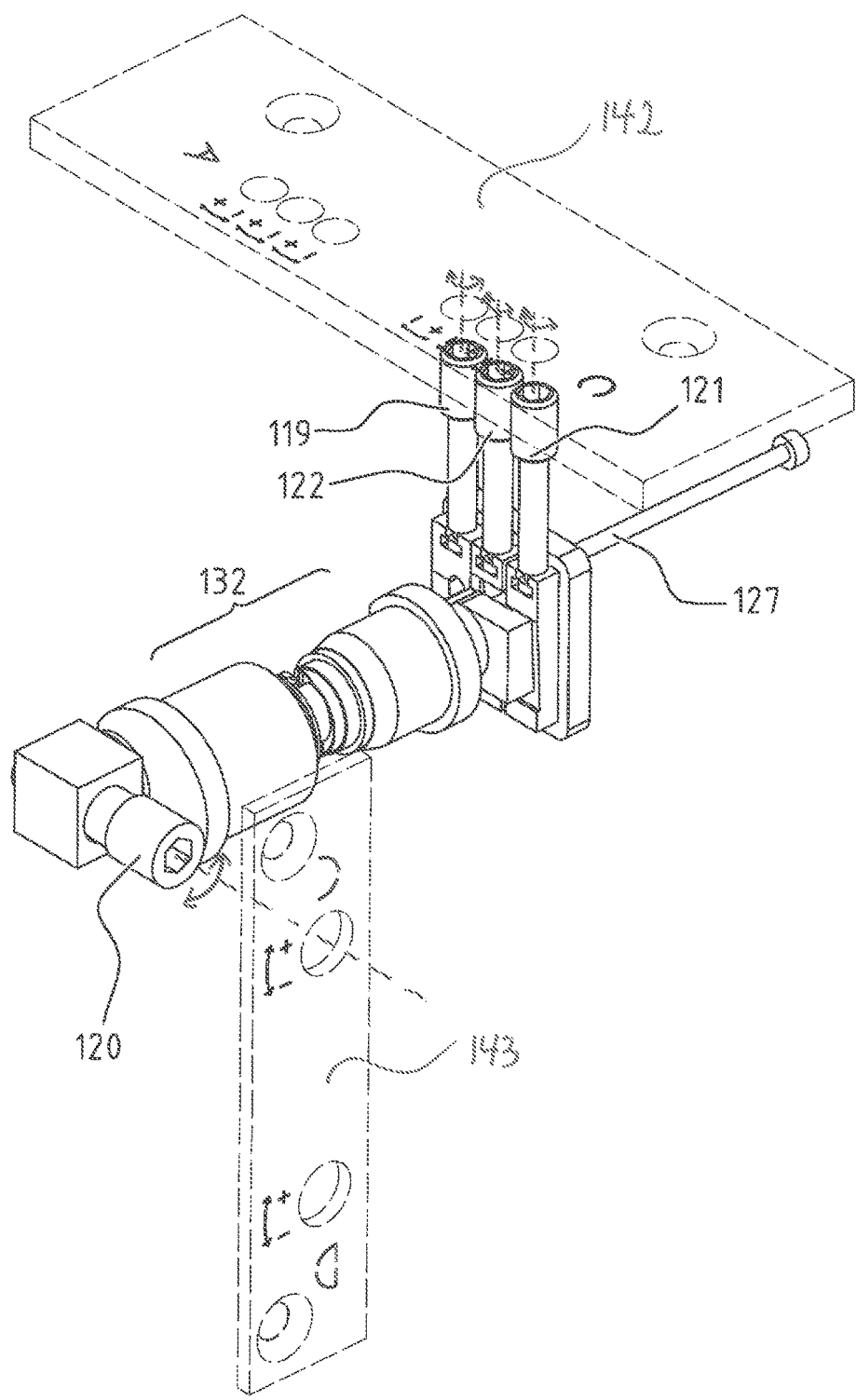
FIG. 19 shows an overview of the movable parts of the mould.

FIG. 19 is a perspective view of mould components 132 of a preferred embodiment of mould 118 which defines the counter-mould for one of the plurality of injection-moulded products 128 to 131, wherein the dimensions of the above stated support part 105, valve seat 109 and cam parts 113 and 114 can be changed by adjusting parts movable in the mould by means of the respective adjusting screws 119, 121 and 122 which are located in adjusting plate 162 and can be operated through openings in cover plate 142, and cushion part 106 by means of adjusting screw 120 which is situated in front plate 133 and can be operated through an opening in cover plate 143. FIG. 19 also shows one of the four ejector pins 127 for releasing one of the plurality of stated injection-moulded products 128 to 131 from mould 118 following cooling of mould 118.

Figure 20:
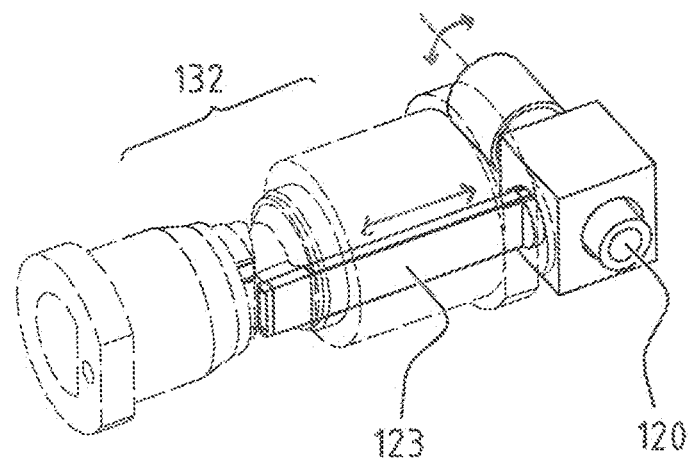
FIG. 20 shows the movable component of the mould with which the height of a cushion part of the housing of the flow limiting element can be defined.
Figure 21:
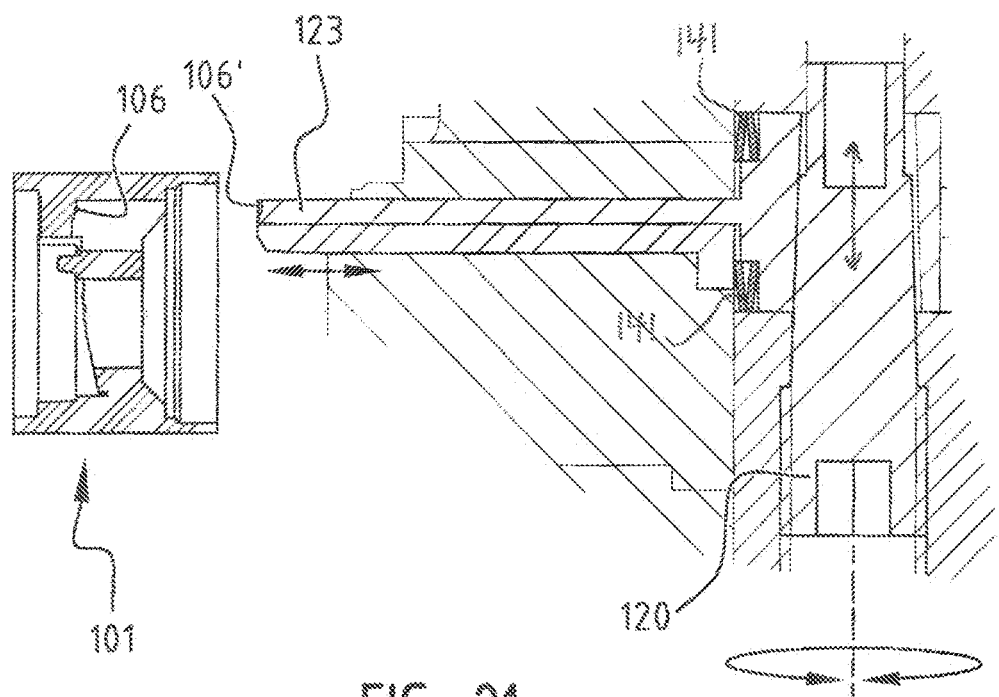
FIG. 21 is a side view of the movable component of the mould with which the height of a cushion part of the housing of the flow limiting element can be defined.

FIG. 20 is a perspective view of mould components 132 of a preferred embodiment of mould 118 which define the counter-mould for one of the plurality of injection-moulded products 128 to 131, wherein the adjustable mould component 123 is shown for changing the dimensions of cushion part 106 along the longitudinal axis of the mould by means of turning the adjusting screw 120 situated in front plate 133. A cross-section of this adjusting screw 120 and the movable cavity shape-defining mould component 123 with recess 106' is shown together with a cross-section of housing 101 of the flow limiting element in FIG. 21 by way of illustrating the operation of recess 106' in this movable component 123 on cushion part 106 of housing 101. The cross-section of FIG. 21 also shows the operation of the adjusting screw on the cavity shape-defining component 123, and clarifies how the adjusting means or adjusting screw 120 moves and tapers due to adjustment, this providing for a continuously variable adjustment of component 123. FIG. 21 also shows a resilient element 141 for moving component 123 outward relative to the cavity when the adjusting screw is turned toward the outer side of adjustable mould 118.

Figure 22:
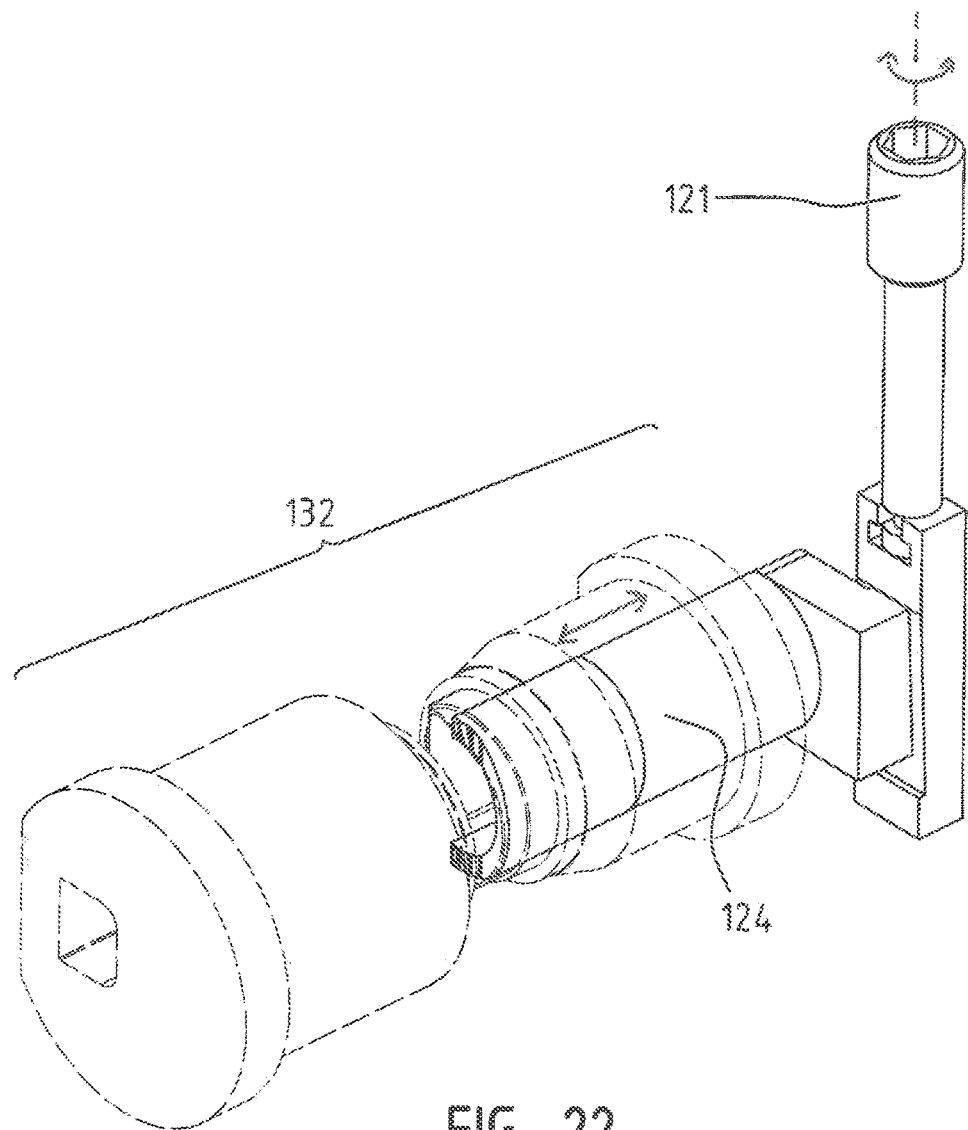
FIG. 22 shows the movable component of the mould with which the height of a valve seat of the flow limiting element can be defined.
Figure 23:
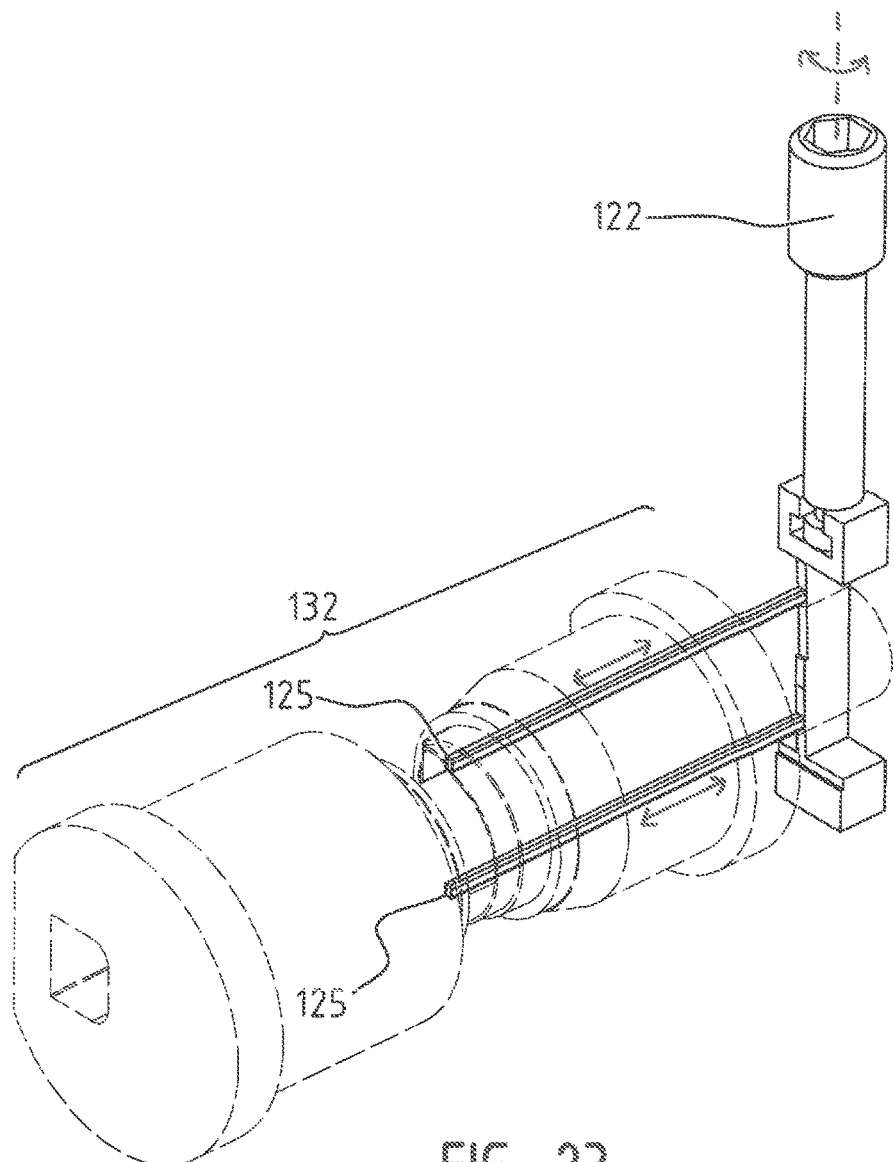
FIG. 23 shows the movable component of the mould with which the height of cam parts of the housing of the flow limiting element can be defined.
Figure 24:
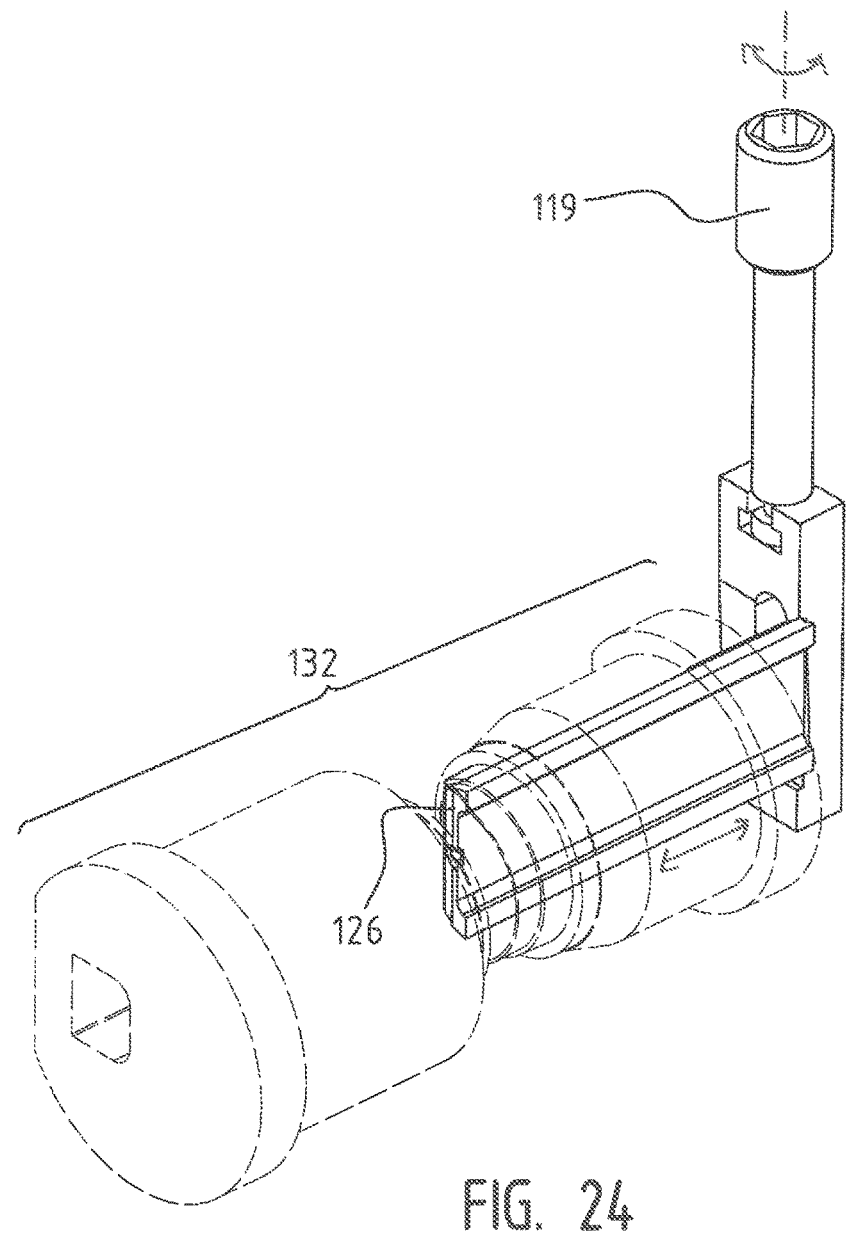
FIG. 24 shows the movable component of the mould with which the height of a support part of the housing of the flow limiting element can be defined.

FIG. 22 to 24 are perspective views of mould components 132 of a preferred embodiment of mould 118 which define the counter-mould for one of the plurality of injection-moulded products 128 to 131, wherein the respective mould components 124, 125 and 126 adjustable along the longitudinal axis of the mould are shown for changing the dimensions, shape and/or sizes of respectively the valve seat 109, cam parts 113 and 114 and support part 105 by means of turning respective adjusting screws or adjusting means 121, 122 and 119. These are also adjusting means which move in a channel which tapers due to the shape and the position of the movable component determined by the resilient elements (such as resilient element 141 as shown in FIG. 21), this providing for a continuously variable adjustment of the cavity shape-defining components.

The present invention is not limited to the above described preferred embodiment; the rights are defined by the claims, within the scope of which many modifications can be envisaged.

The invention claimed is:

1. A flow limiting element, comprising:
a housing provided with an inlet, an outlet and a throughflow opening;
a valve seat arranged in the housing adjacently of the throughflow opening; and
a resilient plate-like valve element mounted in the housing and configured to substantially close the throughflow opening by resilient movement in a direction of the valve seat arranged in the housing adjacently of the throughflow opening, wherein the resilient plate-like valve element is fixed on one side at a fixation point and the resilient plate-like valve element can move resiliently on an opposite side in the direction of the valve seat, wherein the valve seat includes a plurality of cam parts configured to limit a stroke of at least a part of a freely moving part of the resilient plate-like valve element, and wherein a distance of the cam parts from the fixation point differs.

2. The flow limiting element according to claim 1, wherein the plurality of cam parts of the valve seat includes at least one pair of cam parts configured to limit a stroke of the resilient plate-like valve element, wherein the at least one pair of cam parts is arranged asymmetrically, and wherein a distance of the at least one pair of cam parts from the fixation point differs.

3. The flow limiting element according to claim 1, wherein at least a part of a surface of the valve seat extends on a side remote from a fixed side of the resilient plate-like valve element such that a distance between the valve seat and the resilient plate-like valve element is greater at a position of an outer peripheral edge of the valve seat than at a position of an inner peripheral edge of the valve seat.

4. The flow limiting element according claim 3, wherein said part of the surface of the valve seat extends obliquely from the fixation point toward the housing.

5. The flow limiting element according to claim 3, wherein a distance between an outer and an inner diameter of said part of the surface of the valve seat amounts to 5% to 40%, of the distance between the fixed side of the resilient part of the valve element and a resiliently movable outer end of the resilient plate-like valve element.

6. The flow limiting element according to claim 3, wherein the valve seat has between said part of the surface of the valve seat and the fixation point of the resilient plate-like valve element at least one recess which locally increases the distance between the resilient plate-like valve element and the valve seat.

7. The flow limiting element according to claim 1, wherein a surface of the valve seat is curved such that a distance between the valve seat and the freely moving part of the valve element is greater at an end of a resiliently movable part of the resilient plate-like valve element than at the fixation point.

8. The flow limiting element according to claim 1, wherein the resilient plate-like valve element is mounted releasably in the housing.

9. The flow limiting element according to claim 1, wherein the resilient plate-like valve element is supported on a support point in the housing by an eccentric hole in the resilient plate-like valve element.

10. The flow limiting element according to claim 9, wherein the housing includes a cushion part which, together with the support point, determines a degree of clamping of the resilient plate-like valve element at an end of the fixed part of the resilient plate-like valve element.

11. The flow limiting element according to claim 1, wherein the resilient plate-like valve element is of sheet steel.

12. A flow limiting element, comprising: a housing provided with an inlet, an outlet and a throughflow opening; and a resilient plate-like valve element which is mounted in the housing and configured to substantially close the throughflow opening by resilient movement in a direction of the valve seat, the valve seat having at least one cam part extending toward the resilient plate-like valve element, the at least one cam part configured to prevent closure of the resilient plate-like valve element, the valve seat being arranged in the housing adjacently of the throughflow opening, wherein the resilient plate-like valve element is fixed on one side at a fixation point and the resilient plate-like valve element can move resiliently on an opposite side in the direction of the valve seat, wherein at least a part of a surface of the valve seat extends on a side remote from a fixed side of the valve element such that a distance between the valve seat and the valve element is greater at a position of an outer peripheral edge of the valve seat than at a position of an inner peripheral edge of the valve seat.

13. The flow limiting element according to claim 12, wherein the valve seat has between said part of the valve seat and the fixation point of the resilient plate-like valve element at least one recess which locally increases the distance between the resilient plate-like valve element and the valve seat.

14. The flow limiting element according claim 12, wherein said part of the surface of the valve seat extends obliquely from the fixation point toward the housing.

15. The flow limiting element according to claim 12, wherein a distance between an outer and an inner diameter of said part of the valve seat amounts to 5% to 40% of a distance between a fixed side of a resilient part of the resilient plate-like valve element and a resiliently movable outer end of the resilient plate-like valve element.

16. The flow limiting element according to claim 12, wherein the at least one cam part includes a plurality of cam parts configured to limit a stroke of at least a part of a freely moving part of the resilient plate-like valve element, wherein a distance of the cam parts from the fixation point differs.

17. The flow limiting element according to claim 16, wherein the plurality of cam parts of the valve seat includes at least one pair of cam parts configured to limit a stroke of the valve element, wherein the at least one pair of cam parts is arranged asymmetrically, and wherein a distance of the at least one pair of cam parts from the fixation point differs.

18. The flow limiting element according to claim 12, wherein a surface of the valve seat is curved such that the distance between the valve seat and a freely moving part of the resilient plate-like valve element is greater at an end of a resiliently movable part of the resilient plate-like valve element than at the fixation point.

19. The flow limiting element according to claim 12, wherein the resilient plate-like valve element is mounted releasably in the housing.

20. The flow limiting element according to claim 12, wherein the resilient plate-like valve element is supported on a support point in the housing by an eccentric hole in the resilient plate-like valve element.

21. The flow limiting element according to claim 12, wherein the housing includes a cushion part which, together with a support point, determines a degree of clamping of the resilient plate-like valve element at an end of a fixed part of the resilient plate-like valve element.

22. The flow limiting element according to claim 12, wherein the resilient plate-like valve element is of sheet steel.

* * * * *